March 14, 1967 R. W. EGGLESTONE ET AL 3,309,593

REVERSING LINE STARTER

Filed Dec. 28, 1964 2 Sheets-Sheet 1

United States Patent Office 3,309,593
Patented Mar. 14, 1967

3,309,593

REVERSING LINE STARTER

Robert W. Egglestone, West Hartford, and Algernon S. Noell, Jr., Windsor, Conn., assignors to Combustion Engineering, Inc., Windsor, Conn., a corporation of Delaware Filed Dec. 28, 1964, Ser. No. 421,272
3 Claims. (Cl. 318—207)

Figure 1:
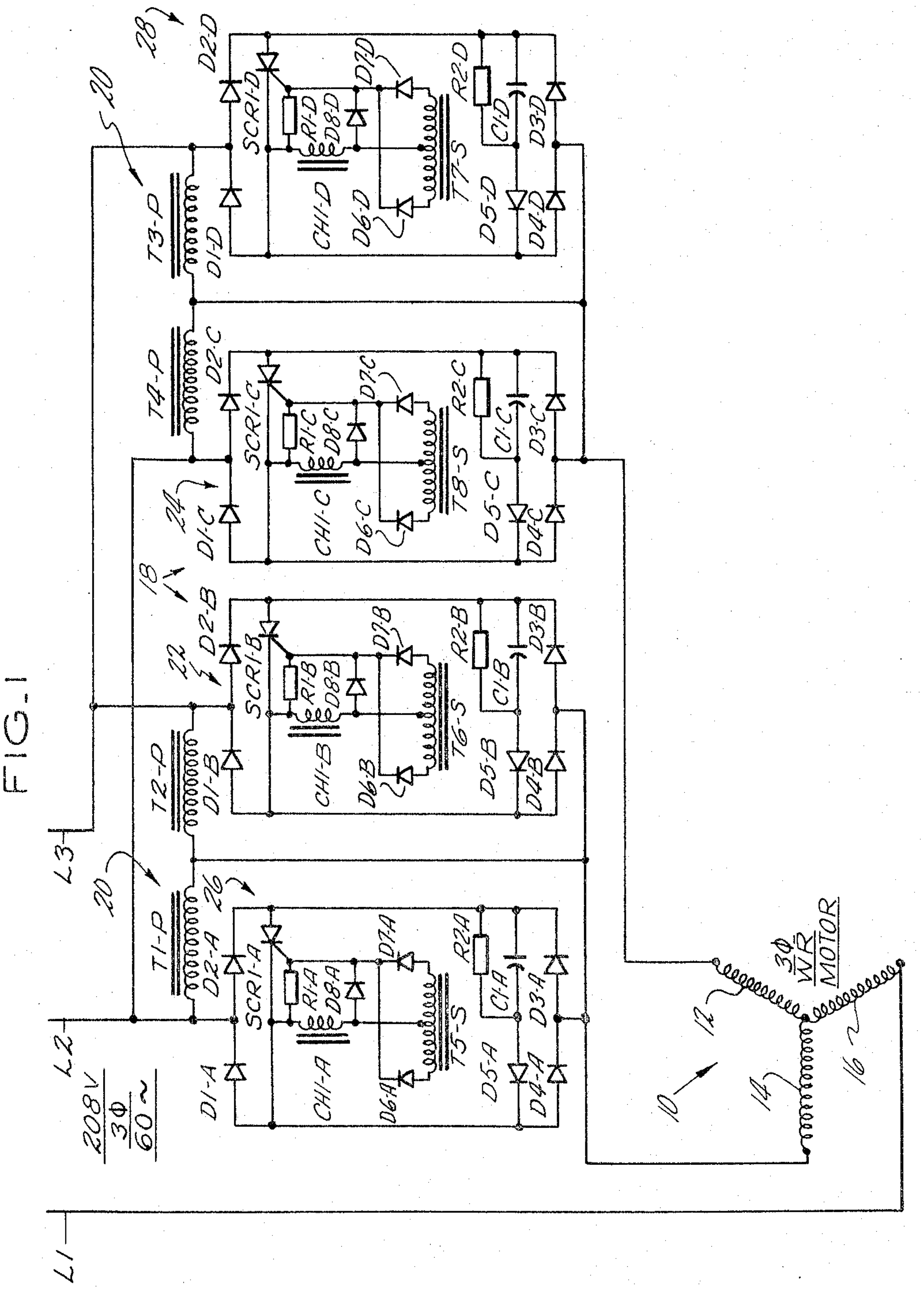

This invention relates generally to a line starter or control for controlling the application of a three-phase electrical power supply to a load, such as a three-phase motor, with the control being such that an on/off action can be achieved and a reversing of the relation of two of the phases of the power supply to the load may be produced. The line starter or control circuit utilizes solid state components and has an interlock arrangement with regard to the reversing feature of the control which prevents line to line shorting during reversing of the phases.

In reversing line starting applications wherein a large number of operations are required or in other words the control is called upon very often to stop, start and reverse a motor or other load, as is the case in automatic controls utilizing on/off servo systems, mechanical contactors are generally not entirely satisfactory because of their limited acceptable operating life. It is accordingly desirable in such control arrangements to have a minimum of mechanical devices and to utilize static semi-conductor devices to as great an extent as possible with the substitution of static devices for mechanical devices being especially desirable in heavy current carrying environments.

The reversing line starter or control circuit of this invention is comprised of solid state electronic components interconnected in such a manner as to provide for an on/off control for the load and to reverse the connection of two of the phases with respect to the load with there being interlock circuitry which is effective to prevent shorting the two phases that are reversed. The circuit in general includes two switching systems with each switching system having a pair of switching means or circuits wherein the switching element is a silicon controlled rectifier. The switching circuits in one of the switching systems establishes a connection between two phases of the power supply and a given portion of the load such as two field coils of the motor while the switching circuits of the other switching system establishes a connection of these same portions of the load with these same two phases of the power supply but with the connections being reversed. Gating of the silicon controlled rectifiers of the switching circuits is controlled through two control circuits, and an interlock is established such that when the silicon controlled rectifiers of one pair of switching circuits is gated the gating of the silicon controlled rectifiers of the other pair of circuits is prevented. This interlock is effected by having the potential for establishing the gate current for the silicon controlled rectifier of one pair of switching circuits come from transformers connected across the switching circuits of the other pair. The switching of these circuits on establishes a very low impedance across these transformers thus reducing the current flow to the transformer substantially to zero so that it is ineffective to provide the potential for gating the silicon controlled rectifier. With this arrangement, when one pair of silicon controlled rectifiers is gated, there is no potential for firing or gating the other silicon controlled rectifiers thus establishing the interlock and preventing simultaneous gating of the silicon controlled rectifiers for the two pairs of switching circuits.

It is an object of this invention to provide an improved reversing line starter or control circiut for a three-phase power supply to control the application of the power supply to a load and reverse two phases of the power supply with respect to the load in a controlled manner.

A further object of the invention is to provide such an improved control system involving an electric circuit utilizing solid state components.

A still further object of the invention is to provide such an improved electrical circuit having an interlock that prevents shorting of the two phases of the power supply which are controllably reversed by the circuit.

Other and further objects of the invention will become apparent to those skilled in the art as the description proceeds.

Figure 2:
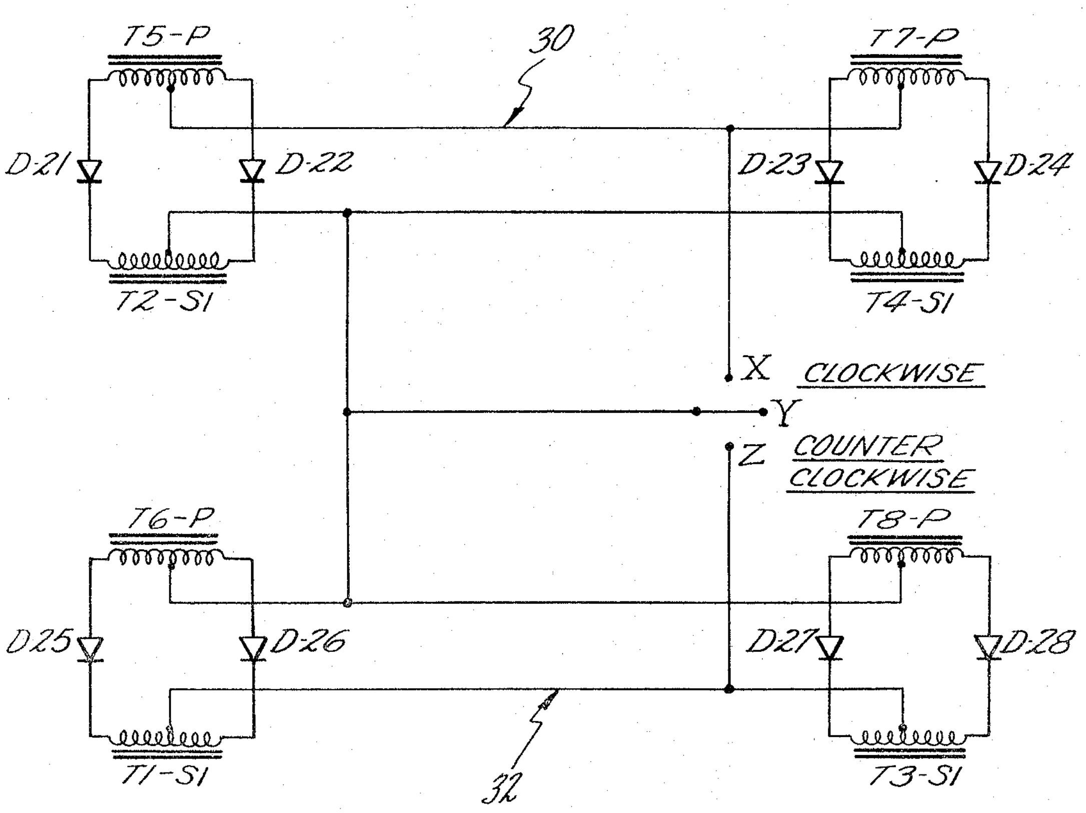

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIGURES 1 and 2 taken together constitute a circuit diagram representing the circuit of the invention.

Referring now to the drawings, wherein like reference characters are used throughout to designate like elements, the illustrative and preferred embodiment of the invention depicted therein is disclosed as applied to a load in the form of three-phase motor 10 diagrammatically represented as having field coils 12, 14 and 16. Power is supplied to this motor from a three-phase power supply with the phases or power supply lines being designated L1, L2 and L3.

The application of power from this supply to the motor is controlled by an electronic circuit comprised of static components and which includes a pair of switching systems, one system being designated generally 18 while the other is designated generally 20. Each of these systems includes a pair of switching means with the system 18 having switching means 22 and 24 and the system 20 having switching means 26 and 28. Each of these last-mentioned switching means are of similar construction so that switching means 26 will now be described with the suffix A being used for the components of this switching means while the suffix B applies to the components of switching means 22, the suffix C to the components of switching means 24, and the suffix D to the components of switching means 28. Coming back to the switching means 26 there is included therein SCR1–A (silicon controlled rectifier) connected across a rectifier bridge that includes diodes D1–A, D2–A, D3–A and D4–A. This bridge is interposed between phase L2 of the power supply and coil 14 of the motor and as thus connected into this bridge, the SCR1–A serves as an A.C. switch notwithstanding that it carries unidirectional current. The SCR1–A thus acts as a switch interconnecting phase L2 of the power supply with field coil 14 of the motor. The capacitor C1–A serves as a voltage surge suppressor limiting the transient voltage available for application to SCR1–A and the diodes D1–A, D2–A, D3–A and D4–A. The resistor R2–A provides a discharge path for the capacitor C1–A and the diode D5–A provides protection against high discharge current from C1–A flowing through SCR1–A should this SCR be gated while a charge is present on the capacitor C1–A. Each of the switching means 22, 24 and 28 has the same components as the switching means 26 just described with the bridge of switching means 22 being interposed between phase L3 of the power supply and coil 14 of the motor and the bridge of switching means 24 and 28 being interposed between phase L2 and coil 12 and phase L3 and coil 12, respectively.

A reversing line starter used in conjunction with a three-phase power supply must have a control circuit which is interlocked or which has an interlocking function in order to prevent simultaneous excitation or closing of contactors which could create a line-to-line short circuit. In the instant illustrative embodiment, since coil 14 of the motor is connected with phase L2 of the power supply through switching means 26 and with phase L3 through switching means 22 while coil 12 is connected with phase L2 through switching means 24 and phase L3 through switching means 28, it is apparent that simultaneous gating of SCR1–A and SCR1–B will result in a short circuit between phases L2 and L3 of the power supply and a similar short will exist as a result of simultaneous gating of SCR1–C and SCR1–D. The organization of the present invention prevents such simultaneous gating of the SCR's and provides for an interlock effective to insure against this happening. This interlock is obtained by utilizing the source voltage across SCR1–A for firing SCR1–B; the source voltage across SCR1–B for firing SCR1–A; the source voltage across SCR1–C for firing SCR1–D; and the source voltage across SCR1–D for firing SCR1–C.

To explain this more fully, the gating circuit for each of the switching means 22, 24, 26 and 28 includes a resistor R1–A (with reference to switching means 26) connected across the SCR between the gate and cathode. A transformer secondary T5–S is connected into a rectifying network D6–A and D7–A with the transformer secondary having a center tap such that D.C. current is applied to the SCR for firing the same upon energization of the transformer secondary. Resistor R1–A is connected into this gating circuit in order to keep transients from gating the SCR and the inductance or choke CH1–A and the diode D8–A are connected into the gate circuit to smooth out the pulsating D.C. in order to insure minimum gating current. The transformers for the gating circuits of the switching means 22, 24 and 28 have secondaries identified as T6–S, T8–S and T7–S, respectively, while the remainder of these gating circuits are similar to that just described for switching 26 and the components are identified with the letters B, C and D respectively. The primaries of these transformers are part of a control circuit which for purposes of clarity is shown in FIGURE 2.

This circuit has a first portion 30 which when activated will cause firing of SCR's1–A and 1–D or in other words, switching on of the pair of switching means 26 and 28 which make up the switching system 20. This will connect field coil 14 of motor 10 with phase L2 of the power supply and coil 12 with phase L3 thus driving the motor in one direction. The second circuit portion 32 of the control circuit will gate SCR's1–B and 1–C or, in other words, activate the switching means 22 and 24 to reverse the connection of the field coils 12 and 14 and thus drive the motor in the opposite direction.

The control circuit portion 30 includes the transformer secondary T2–S1 interconnected with the transformer primary T5–P via diodes D21 and D22. It also includes the transformer secondary T4–S1 interconnected with the transformer primary T7–P via the diodes 23 and 24. The center taps of the transformer primaries T5–P and T7–P are connected with the switching element or contact X while the center taps of the transformer secondaries T2–S1 and T4–S1 are connected with the contactor of switching element Y. The primary for the transformer secondary T2–S1 is connected across the switching means 22 from power supply phase L3 to the field coil 14 and is identified as T2–P while the primary for transformer secondary T4–S1 is connected across the switching means 24 from power supply phase L2 to field coil 12 and is identified as T4–P. These transformer primaries T2–P and T4–P will be energized when SCR1–B and SCR1–C respectively are not gated or are in a current blocking state. When SCR1–B is energized, the voltage appearing across the switching means 22 is the forward drop of D2–B, D4–B and SCR1–B or D1–B, D3–B and SCR1–B. This voltage drop is not of sufficient magnitude to supply the necessary current to gate SCR1–A. In effect the gating of SCR1–B acts as a short circuit across the transformer primary T2–P. A similar relationship applies to transformer primary T4–P associated with SCR1–C.

If it is assumed that SCR1–B and SCR1–C occupy a current blocking state, then engaging contact Y with contact X will cause energization of the transformer secondaries T2–S1 and T4–S1 which in turn will, through transformers T5 and T7 establish gating currents in the gating circuits for SCR1–A and SCR1–D respectively thus connecting the motor with the power supply in order to drive the motor in one direction.

The second control circuit portion 32 is arranged similarly to control circuit portion 30 with transformer secondary T1–S1 being interconnected with transformer primary T6–P through diodes D25 and D26 and transformer secondary T3–S1 being interconnected with transformer primary T8–P through diodes D27 and D28. The center taps of transformer primaries T6–P and T8–P are connected with the contactor Y while the center taps of transformer secondaries T1–S1 and T3–S1 are connected with contactor Z. The transformer secondaries T1–S1 and T3–S1 are associated with the transformer primaries T1–P and T3–P with these latter primaries being connected across the bridge or switching means 26 and 28 respectively. Thus this second control circuit portion establishes an interlock such that gating current may be supplied to gate SCR1–B and SCR1–C provided SCR1–A and SCR1–D, respectively, are in their current blocking position. With this control arrangement it can be seen that it is not possible to simultaneously gate SCR1–A and SCR1–B nor is it possible to simultaneously gate SCR1–C and SCR1–D thereby providing a positive interlock preventing a direct short between the phases L2 and L3 of the power supply while at the same time providing a control circuit for effectively reversing the application of these two phases to the motor in order to provide for driving the motor in either the forward or the reverse direction.

It will be appreciated that the contactors X, Y and Z are only diagrammatically represented with these contactors preferably being static, solid state components that receive signals from actuators or sensing elements such as means sensing the megawatt output, steam flow, temperature or the like in a power plant and provide a signal for driving motor 10 in the desired direction to a desired position to provide the required control action.

While we have illustrated and described a preferred embodiment of our invention it is to be understood that such is merely illustrative and not retrictive and that variations and modifications may be made therein without departing from the spirit and scope of the invention. We therefore do not wish to be limited to the precise details set forth but desire to avail ourselves of such changes as fall within the purview of our invention.

What is claimed is:

1. An electrical reversing line starter operative to control the application of a three-phase power supply to a three-phase load comprising in combination first switching means interconnecting one phase of the power supply with one phase of the load, fourth switching means interconnecting another phase of the power supply with another phase of the load, second and third switching means interconnecting said other and said one phases of the power supply, respectively, with said one and said other phases of the load, respectively, each of said switching means including a rectifier bridge connected intermediate the respective phase of the power supply and the respective phase of the load, a silicon controlled rectifier connected in said bridge in a manner to control the passage of current through the bridge from the power supply to the load, a control circuit for controlling the gating of the silicon controlled rectifiers and including first, second, third and fourth transformers the primaries of which are connected respectively across the rectifier bridge network of the first, second, fourth and third switching means, fifth, sixth, seventh and eighth transformers the secondaries of which are connected into the gating circuit of the silicon controlled rectifier of the first, second, fourth and third switching means, respectively, to provide gating current therefor, means for rectifying the current produced by these secondary windings and applying it to the gate of the silicon controlled rectifier, the secondary windings of the first and fourth transformers being interconnected with the primary windings of the sixth and seventh transformers to energize these latter transformers incident to energization of the former transformers and the secondary windings of the second and third transformers being interconnected with the primary of the fifth and eighth transformers to likewise energize these latter transformers incident to energization of said second and third transformers.

2. An electrical reversing line starter operative to control the application of a three-phase power supply to a three-phase load comprising in combination first switching means interconnecting one phase of the power supply with one phase of the load, fourth switching means interconnecting another phase of the power supply with another phase of the load, second and third switching means interconnecting said other and said one phases of the power supply, respectively, with said one and said other phases of the load, respectively, each of said switching means including a rectifier bridge connected intermediate the respective phase of the power supply and the respective phase of the load, a silicon controlled rectifier connected in said bridge in a manner to control the passage of current through the bridge from the power supply to the load, a transformer connected across the rectifying bridge network of each of the switching means, a gating circuit forming part of each of the switching means for gating the silicon controlled rectifier of the switching means and means coupling a signal developed in the transformer across the first and fourth switching means into the gating circuit of the second and third switching means respectively for gating the silicon controlled rectifier and means coupling a signal developed in the transformer across the second and third switching means into the gating circuit of the first and fourth switching means respectively for gating the silicon controlled rectifier of these respective switching means and means controlling the coupling of said signals into said gating circuits.

3. The electrical reversing line starter of claim 2 wherein the means for coupling said signals into the gating circuits includes a transformer in the gating circuit having its primary connected with the secondary of the transformer connected across the respective switching means.

References Cited by the Examiner

UNITED STATES PATENTS

| | | | |
|---|---|---|---|
| 2,188,804 | 1/1940 | Boeker | 318—207 X |
| 2,970,251 | 1/1961 | Wickerham | 318—207 |
| 3,183,423 | 5/1965 | Manners | 318—207 X |
| 3,183,425 | 5/1965 | Slawson | 318—227 |
| 3,252,067 | 5/1966 | Derenbecher | 318—227 X |
| 3,253,202 | 5/1966 | Cotton | 318—227 |

ORIS L. RADER, *Primary Examiner.*

G. Z. RUBINSON, *Assistant Examiner.*